US009251408B2

(12) United States Patent
Lee et al.

(10) Patent No.: US 9,251,408 B2
(45) Date of Patent: Feb. 2, 2016

(54) GESTURE RECOGNITION MODULE AND GESTURE RECOGNITION METHOD

(71) Applicant: Wistron Corporation, New Taipei (TW)

(72) Inventors: Chih-Hsuan Lee, New Taipei (TW); Chia-Te Chou, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 94 days.

(21) Appl. No.: 14/012,991

(22) Filed: Aug. 28, 2013

(65) Prior Publication Data
US 2014/0185868 A1 Jul. 3, 2014

(30) Foreign Application Priority Data
Dec. 28, 2012 (TW) .............................. 101151015 A (51) Int. Cl.
*G06K 9/00* (2006.01)
(52) U.S. Cl.
CPC .................................. *G06K 9/00355* (2013.01)
(58) Field of Classification Search
None
See application file for complete search history.

(56) References Cited

U.S. PATENT DOCUMENTS

| 6,204,852 | B1 * | 3/2001 | Kumar et al. ................. 345/419 |
|---|---|---|---|
| 2009/0167882 | A1 | 7/2009 | Chen |
| 2010/0060570 | A1 * | 3/2010 | Underkoffler et al. ........ 345/156 |
| 2011/0298827 | A1 * | 12/2011 | Perez ............................ 345/647 |
| 2012/0146903 | A1 * | 6/2012 | Arihara et al. ................. 345/158 |
| 2013/0194175 | A1 * | 8/2013 | Tarama et al. ................. 345/156 |
| 2013/0249793 | A1 * | 9/2013 | Zhu et al. ....................... 345/157 |

FOREIGN PATENT DOCUMENTS

| TW | 200928892 | 7/2009 |
|---|---|---|
| TW | M382675 | 6/2010 |
| TW | 201250609 | 12/2012 |
| WO | 2012139268 A1 | 10/2012 |

OTHER PUBLICATIONS

Greensted, "3D Coordinates," last modified Sep. 2010, accessed on Jun. 13, 2015 at <http://www.labbookpages.co.uk/audio/beamforming/coordinates.html>.*
Office action mailed on Apr. 14, 2015 for the Taiwan application No. 101151015, filing date: Dec. 28, 2012, p. 1 line 1-14, p. 2-21 and p. 22 line 1-17.

* cited by examiner

*Primary Examiner* — Vu Le
*Assistant Examiner* — Alexander J Lesnick
(74) *Attorney, Agent, or Firm* — Winston Hsu; Scott Margo (57) ABSTRACT

A gesture recognition module for recognizing a gesture of a user, includes a detecting unit, including at least one image capture device, for capturing at least one image of a hand of the user, to obtain a first position and a second position of the hand sequentially; a computing unit, electrically coupled to the detecting unit, for determining a first angle between a first virtual straight line connected between a fixed reference point and the first position and a reference plane passing through the fixed reference point, and determining a second angle between a second virtual straight line connected between the fixed reference point and the second position and the reference plane; and a determining unit, electrically coupled to the computing unit, for determining a relation between the first angle and the second angle, to decide whether a gesture of the hand is a back-and-forth gesture.

28 Claims, 6 Drawing Sheets

GESTURE RECOGNITION MODULE AND GESTURE RECOGNITION METHOD

BACKGROUND OF THE INVENTION

1. Field of the Invention

The present invention relates to a gesture recognition module and a gesture recognition method, and more particularly, to a gesture recognition module and a gesture recognition method capable of recognizing a back-and-forth gesture of a hand accurately.

2. Description of the Prior Art

With the progress and spread of a high-speed network, a user can watch digital contents and multimedia information via a computer or a set-top box. In general, the user needs to input a command to the computer or the set-top box via an input device such as a keyboard, a mouse, etc., to control the computer or the set-top box, e.g., select or display the digital contents and the multimedia information. That is, it is difficult to control the computer or the set-top box, if the user does not (or is not inconvenient to) use the abovementioned input devices. Thus, convenience of the computer or the set-top box is limited.

On the other hand, as technology of image recognition becomes more and more mature, gaming devices with the image recognition are provided by video game manufacturers, peripheral devices with the image recognition are provided by computer manufacturers and liquid crystal display (LCD) televisions (TVs) with the image recognition are provided by appliance manufacturers. Thus, the user can control a gaming device, a peripheral device or a LCD TV via the image recognition. Among various types of the image recognition, one of widely used image recognition is gesture recognition. When controlling an abovementioned device via the gesture recognition, the user needs to make a predetermined gesture in front of a detector (e.g., camera) coupled to the device. Then, the device can determine (i.e., recognize) a command inputted by the user, and execute an operation corresponding to the command.

However, accuracy of the gesture recognition is easily affected by the position of the user. For example, when the user wants to control a LCD TV via the image recognition, a detector of the LCD TV detects gestures of the user for determining commands that the user wants to perform, so as to make the LCD TV to execute corresponding operations. When the user stands directly in front of the detector and faces the LCD TV, the LCD TV can accurately determines the gestures of the user, especially three-dimensional (3D) gestures (e.g. pushing forward gesture or pulling back gesture), through detecting the positions of the hand before and after the hand moves (e.g. the variations of the positions of the hand in top-and-bottom direction (Y-axis), left-and-right direction (X-axis) or back-and-forth direction (Z-axis)). When the user stands obliquely in front of the detector or obliquely faces the LCD TV, the detector detects variation of the positions of the hand in the back-and-forth direction (Z-axis) even the gesture of the user is a lateral gesture (i.e. the hand moves in X-axis and/or Y-axis) instead of the back-and-forth gesture. In such a condition, the detector would erroneously decide the gesture is the back-and-forth gesture and executes inappropriate operations or does not execute any operation. Although an image recognition algorithm with a higher complexity or the detector with a higher cost can be used to improve the accuracy of the gesture recognition, manufacturing cost increases accordingly and sales of the products may be degraded. Thus, improving the accuracy of the gesture recognition with a lower cost is a topic to be discussed and addressed.

SUMMARY OF THE INVENTION

Therefore, the present invention discloses a gesture recognition module and a gesture recognition method to solve the abovementioned problem.

A gesture recognition module for recognizing a gesture of a user is disclosed. The gesture recognition module comprises a detecting unit, comprising at least one image capture device, for capturing at least one image of a hand of the user, to obtain a first position and a second position of the hand sequentially; a computing unit, electrically coupled to the detecting unit, for determining a first angle between a first virtual straight line connected between a fixed reference point and the first position and a reference plane passing through the fixed reference point, and determining a second angle between a second virtual straight line connected between the fixed reference point and the second position and the reference plane; and a determining unit, electrically coupled to the computing unit, for determining a relation between the first angle and the second angle, to decide whether a gesture of the hand is a back-and-forth gesture.

A gesture recognition method for recognizing a gesture of a user is disclosed. The gesture recognition method comprises capturing at least one image of a hand of the user, to obtain a first position and a second position of the hand sequentially; determining a first angle between a first virtual straight line connected between a fixed reference point and the first position and a reference plane passing through the fixed reference point, and determining a second angle between a second virtual straight line connected between the fixed reference point and the second position and the reference plane; and determining a relation between the first angle and the second angle, to decide whether a gesture of the hand is a back-and-forth gesture.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
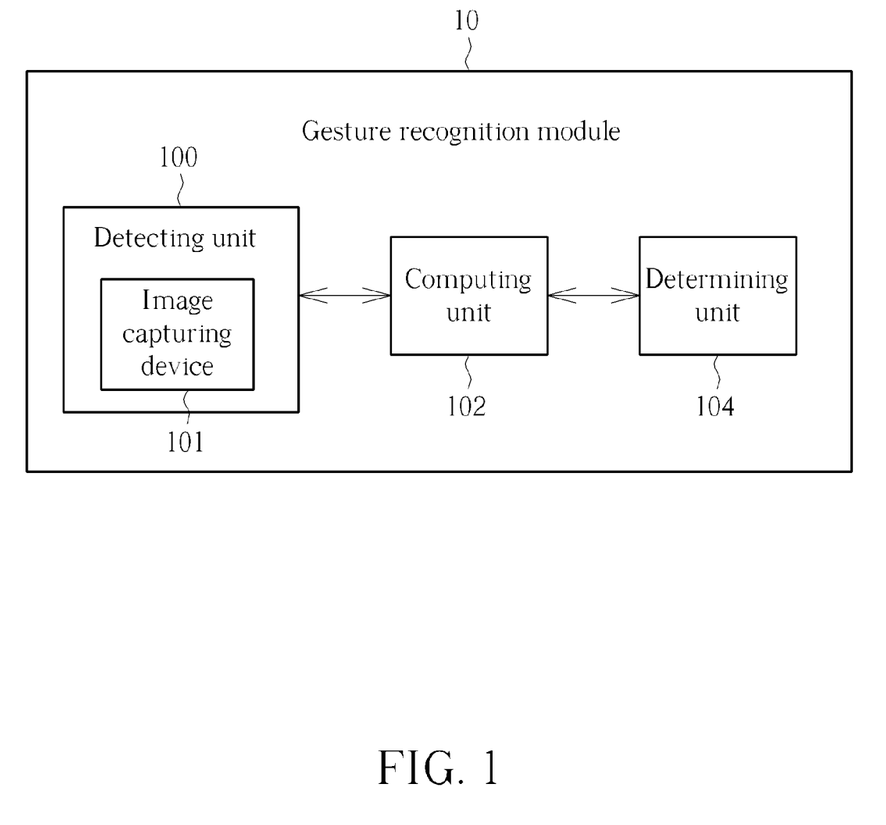
FIG. 1 is a schematic diagram of a gesture recognition module according to an embodiment of the present invention.

Please refer to FIG. 1, which is a schematic diagram of a gesture recognition module 10 according to an embodiment of the present invention. The gesture recognition module 10 is composed of a detecting unit 100, a computing unit 102 and a determining unit 104. In detail, the detecting unit 100 comprises at least one image capturing device 101, for capturing at least one image of a hand of a user, to obtain a first position and a second position of the hand sequentially. For example, the at least one image capturing device 101 may be two cameras separated by a certain distance or a depth camera co-operates with a regular camera, but is not limited herein. The computing unit 102 is electrically coupled to the detecting unit 100, for determining a first angle between a first virtual straight line which is connected between a fixed reference point and the first position, and a reference plane, which passes through the fixed reference point, and determining a second angle between a second virtual straight line which is connected between the fixed reference point and the second position, and the reference plane. The determining unit 104 is electrically coupled to the computing unit 102, for determining a relation between the first angle and the second angle, to decide whether a gesture of the hand is a back-and-forth gesture. In brief, after the detecting unit 100 detects the positions of the hand before and after the hand moves, the computing unit 102 obtains two angles between two virtual straight lines and the reference plane, respectively, according to the two virtual straight lines connected between the positions before and after the hand moves and the reference point. The determining unit 104 can therefore decides the gesture of the user according to variations (i.e. differences) of the angles.

Please note that, the gesture recognition module 10 shown in FIG. 1 is simply used for illustrating the present invention. Practically, the detecting unit 100, the computing unit 102 and the determining unit 104 can be integrated into a single gesture recognition unit (e.g., gesture recognition chip), and is not limited herein. Besides, the gesture recognition module 10 can be coupled to any device such as a mouse, a keyboard, a set-top box, a motion-sensing game console, a handheld device (e.g., mobile device), a liquid crystal display (LCD) television (TV), a smart TV, etc. Thus, a predetermined command can be triggered according to a recognition result, and the device can be controlled accordingly.

Figure 2:
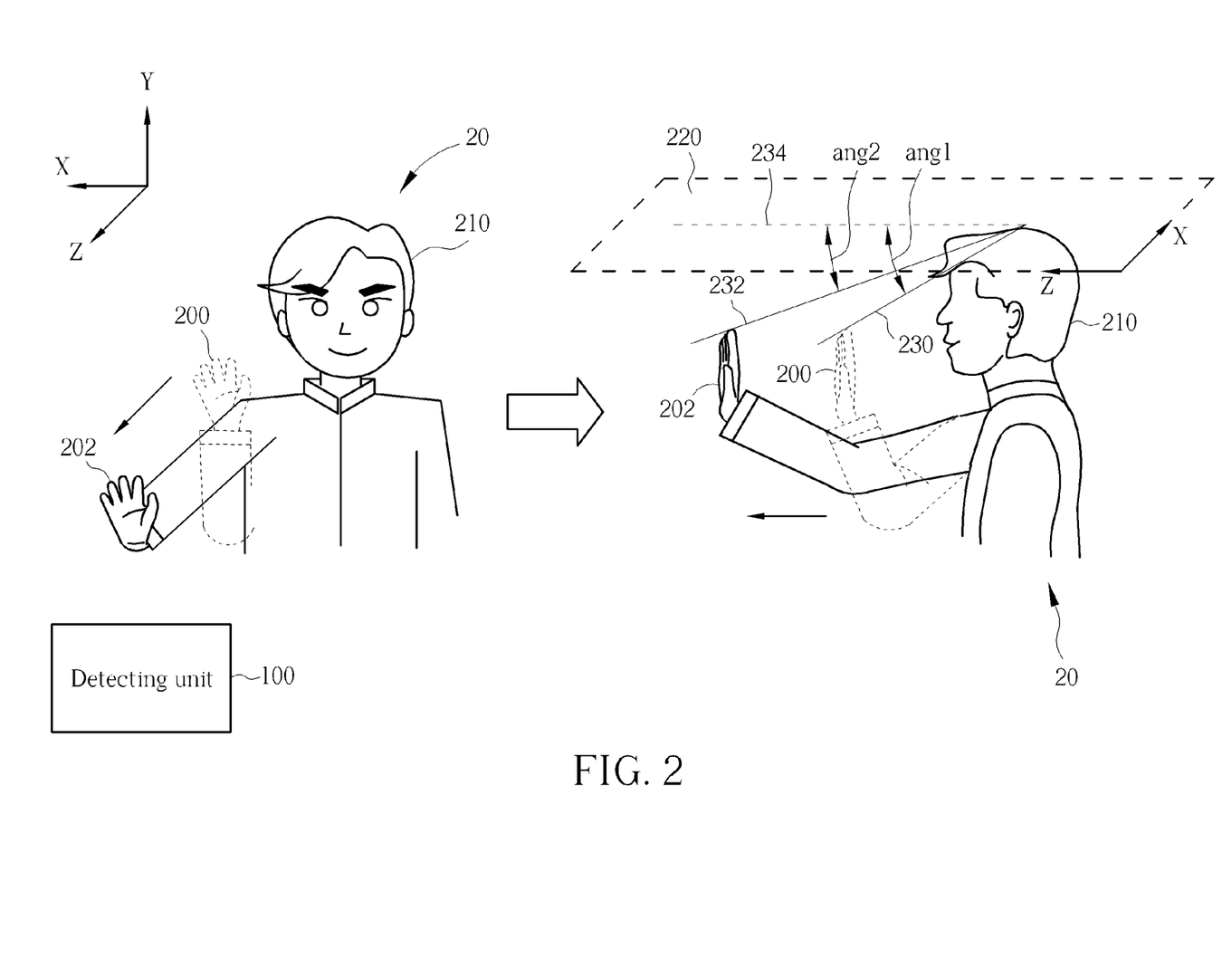
FIG. 2 is a schematic diagram of a gesture of the user according to an embodiment of the present invention.

Please refer to FIG. 2, which is a schematic diagram of a gesture of the user according to an embodiment of the present invention, wherein a pushing forward gesture is utilized for illustrating the concept of the present invention in cooperation with X-Y-Z coordinates and direction arrows shown in FIG. 2. In FIG. 2, a user 20 locates in front of the detecting unit 100 (is not limited to directly in front of the detecting unit 100) and makes the pushing forward gesture. The hand of the user 20 moves from a position 200 to a position 202 (i.e. the positions of the hand vary in the Z-axis). After the image capturing device 101 of the detecting unit 100 captures images of the hand, the position 200 and the position 202 are acquired in sequence. Next, the computing unit 102 generates a virtual straight line 230 between the position 200 and a head 210 (the reference point), to determine an angle ang1 between the virtual straight line 230 and a reference plane 220 (i.e. X-Y plane) passing through the head 210. The computing unit 102 generates a virtual straight line 232 between the position 202 and the head 210, to determine an angle ang2 between the virtual straight line 232 and the reference plane 220. The determining unit 104 can therefore decide the gesture of the user according to the relation between the angle ang1 and the angle ang2. For example, the determining unit 104 decides the gesture is the back-and-forth gesture when a difference between the angle ang1 and the angle ang2 is greater than a predetermined value Th1 (i.e., |ang1−ang2|>Th1); otherwise, the determining unit 104 decides the gesture is the lateral gesture instead of the back-and-forth gesture when the difference between the angle ang1 and the angle ang2 is smaller than the predetermined value Th1 (i.e., |ang1−ang2|<Th1). In other words, the position of the hand changes when the user makes the gesture. When the variation of the angle corresponding to the variation of the position is greater than the predetermined value Th1 (i.e. the angle variation is sufficiently high and the possibility of misjudging is small), the determining unit 104 determines and decides the gesture of the user is the back-and-forth gesture rather than the lateral gesture. As a result, even the user does not locates directly in front of the detecting unit 100 or the user locates at oblique direction of the detecting unit 100, the possibility of erroneously determining the lateral gesture as the back-and-forth gesture can be decreased through the above concept.

Please note that, this embodiment simply uses the head 210 of the user as the fixed reference point, and more particularly, uses the top of the head as the fixed reference point. Practically, the fixed reference point can be any other fixed point of the user while making the gesture, such as a center, a nose and a mouth of the head of the user. On the other hand, the positions of the hand (i.e. the positions before and after the hand moves) may be positions of characteristic points of the hand, such as positions of a finger tip of a finger (e.g. index finger or middle finger), positions of the center of the palm of the hand or positions of the center of the hand. The X-Y plane is treated as the reference plane 220 for illustrating purpose in the present embodiment. The reference plane 220 can be other planes in the space and is not limited herein. Besides, there are various methods for calculating the angle ang1 and the angle ang2. For example, the computing unit 102 may project the virtual straight line 230 and/or the virtual straight line 232 on the reference plane 220 for acquiring a virtual straight line 234, so as to calculate the angle ang1 between the virtual straight line 230 and the virtual straight line 234 and the angle ang2 between the virtual straight line 232 and the virtual straight line 234.

Moreover, the determining unit 104 can further determine a type of the back-and-forth gesture according to the relation between the angle ang1 and the angle ang2. As shown in FIG. 2, after deciding the gesture of the user is the back-and-forth gesture, the determining unit 102 further decides the back-and-forth gesture is the pushing forward gesture since the angle ang1 is greater than the angle ang2. On the contrary, if the angle ang1 is smaller than the angle ang2 (i.e. the hand of the user moves from the position 232 to the position 230) and the angle variation is greater than the predetermined value Th1, the determining unit 104 decides the back-and-forth gesture is a pulling back gesture. Thus, according to the above concept, the gesture recognition module 10 not only can reduce the possibility of misjudging the back-and-forth gesture, but also can further determines the type of the back-and-forth gesture.

Figure 3:
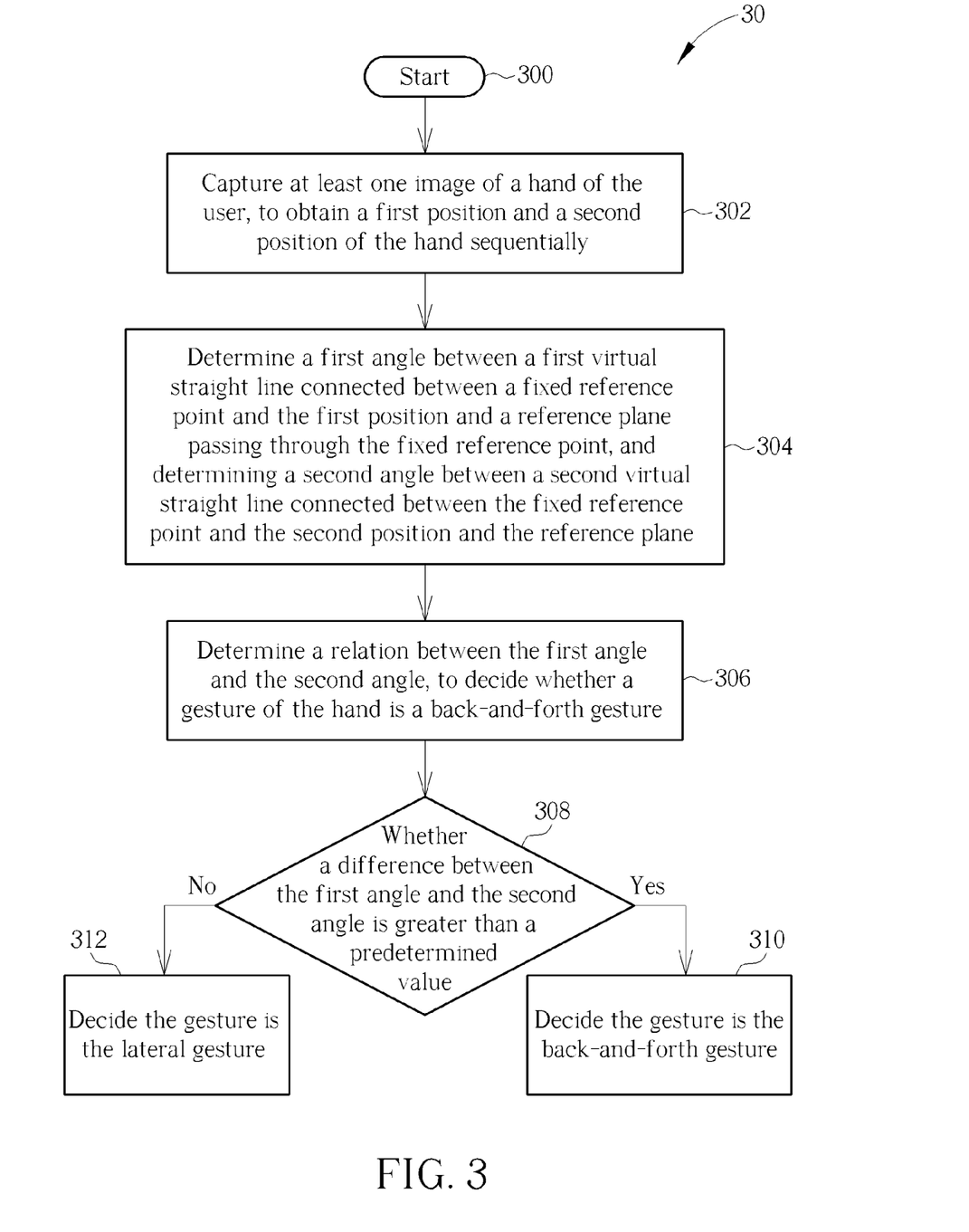
FIG. 3 is a flowchart of a process according to an embodiment of the present invention.

According to the abovementioned description, the operation of the gesture recognition module 10 shown in FIG. 1 can be summarized as a process 30 shown in FIG. 3. The process 30 comprises the following steps:

Step 300: Start.

Step 302: Capture at least one image of a hand of the user, to obtain a first position and a second position of the hand sequentially.

Step 304: Determine a first angle between a first virtual straight line connected between a fixed reference point and the first position and a reference plane passing through the fixed reference point, and determining a second angle between a second virtual straight line connected between the fixed reference point and the second position and the reference plane.

Step 306: Determine a relation between the first angle and the second angle, to decide whether a gesture of the hand is a back-and-forth gesture.

Step 308: Determine whether a difference between the first angle and the second angle is greater than a predetermined value. If the difference between the first angle and the second angle is greater than the predetermined value, perform step 310; otherwise, perform step 312.

Step 310: Decide the gesture is the back-and-forth gesture.

Step 312: Decide the gesture is the lateral gesture.

Operations and variations of the process 30 can be referred to the above illustration, and are not narrated herein.

Figure 4:
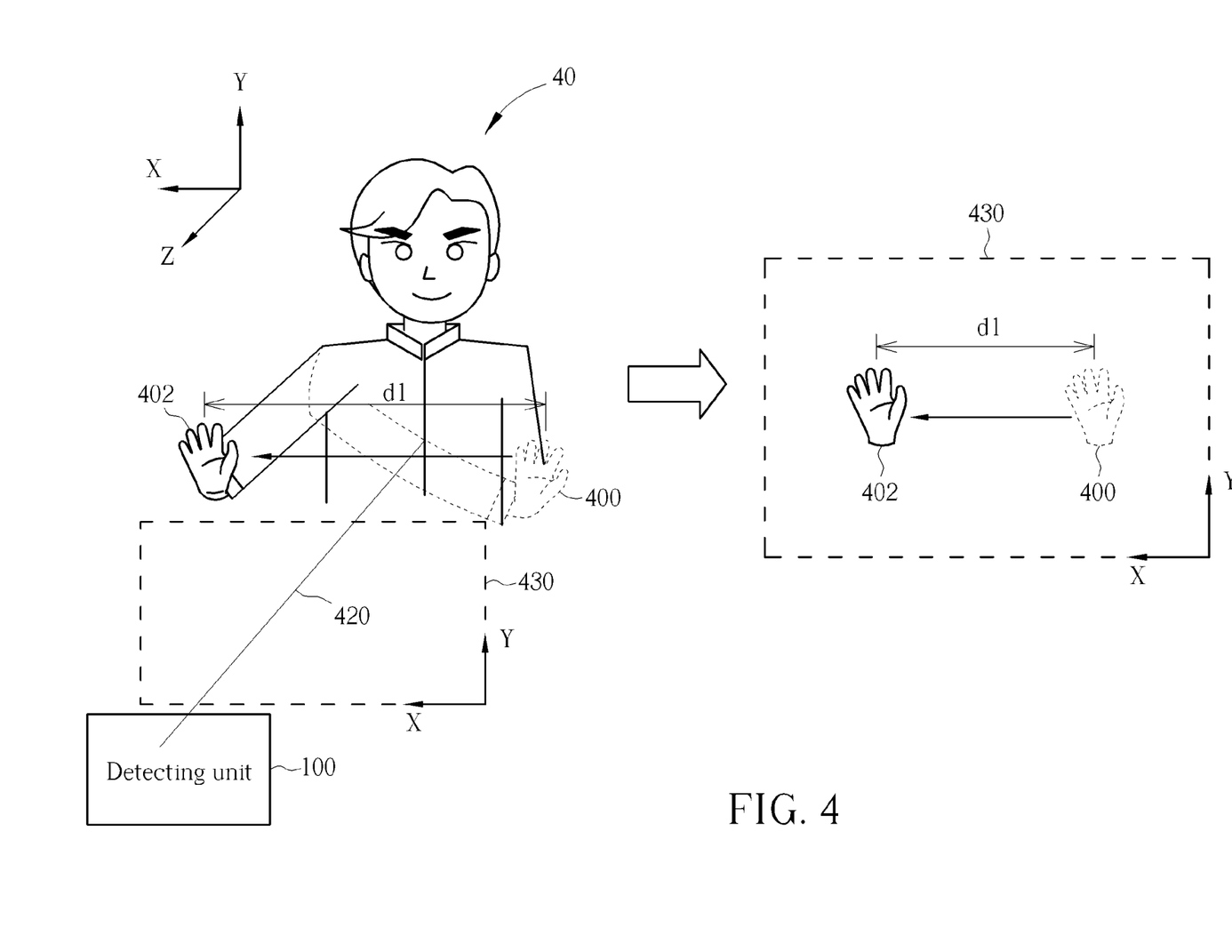
FIG. 4 is a schematic diagram of a gesture of the user according to an embodiment of the present invention.

On the other hand, the determining unit 104 can further determine whether the gesture is the back-and-forth gesture according to a lateral distance and the angle variation of the movement of the hand, for decreasing the possibility of misjudging. In detail, please refer to FIG. 4, which is a schematic of the gesture of the user according to an embodiment of the present invention, wherein a moving right gesture is used for illustrating the concept of the present invention. In FIG. 4, the user 40 locates in front of the detecting unit 100 (is not limited to directly in front of the detecting unit 100) and makes the moving right gesture, such that the hand moves from a position 400 (the left side of the user) to a position 402 (the right side of the user). After the image capturing device 101 of the detecting unit 100 contiguously captures hand images, the position 400 and the position 402 are acquired in sequence. When the lateral distance d1 (or horizontal distance) between the position 400 and the position 402 is greater than a predetermined value Th2 (i.e., d1>Th2), the determining unit 104 decides the gesture is a lateral gesture. On the contrary, when the lateral distance d1 between the position 400 and the position 402 is smaller than the predetermined value Th2 (i.e., d1<Th2), the determining unit 104 decides the gesture is not the lateral gesture.

Next, the determining unit 104 can further determine whether the gesture is the back-and-forth gesture according to the process 30 and the abovementioned description. In other words, the determining unit 104 first determines whether the lateral distance between the position 400 and the position 402 is smaller than a first predetermined value. When the lateral distance between the position 400 and the position 402 is smaller than the first predetermined value and the difference between the angle ang1 and the angle ang2 is greater than a second predetermined value, the determining unit 104 determines the gesture is the back-and-forth gesture. On the contrary, when the lateral distance between the position 400 and the position 402 is smaller than the first predetermined value and the difference between the angle ang1 and the angle ang2 is smaller than the second predetermined value, the user may not make any gesture (e.g. the user may only shake the hand slightly) or make the lateral gesture. In such a condition, the determining unit can further determine the gesture of the user according to whether the difference between the angle ang1 and the angle ang2 is smaller than a third predetermined value. When the difference between the angle ang1 and the angle ang2 is smaller than the third predetermined value, the determining unit 104 determines the user does not make any gesture. Thus, via making examination two or three times (i.e. using two or three predetermined values) for verifying whether the gesture of the user is the back-and-forth gesture, the possibility of misjudging the lateral gesture or the situation that the user does not make a gesture as the back-and-forth gesture can be further reduced.

Please note that, as long as the lateral distance can be utilized for distinguishing the lateral distance, the definition of the lateral distance is not limit to the above. For example, the computing unit 102 may first build a virtual straight line 420 between the detecting unit 100 and the user, and then build a virtual vertical plane 430 on the virtual straight line 420, to decide the lateral distance d1 between the position 400 and the position 402 on the virtual vertical plane 430. For example, the lateral distance d1 may be obtained by projecting the position 400 and the position 402 on the virtual vertical plane 430 and calculating a distance between the projected positions (i.e. the horizontal distance). In FIG. 4, the user horizontally (along X-axis) moves the hand in a left-and-right direction. Thus, the lateral distance is the horizontal distance between positions before and after the hand moves. Practically, when the user vertically (along Y-axis) moves the hand, the lateral distance such as the horizontal distance between positions before and after the hand moves can be obtained according to the above descriptions. In other words, the "lateral" used in the present invention is not limited to the left-and-right direction and is the direction of the hand movement vector projected on the X-Y plane (including the oblique direction).

Figure 5:
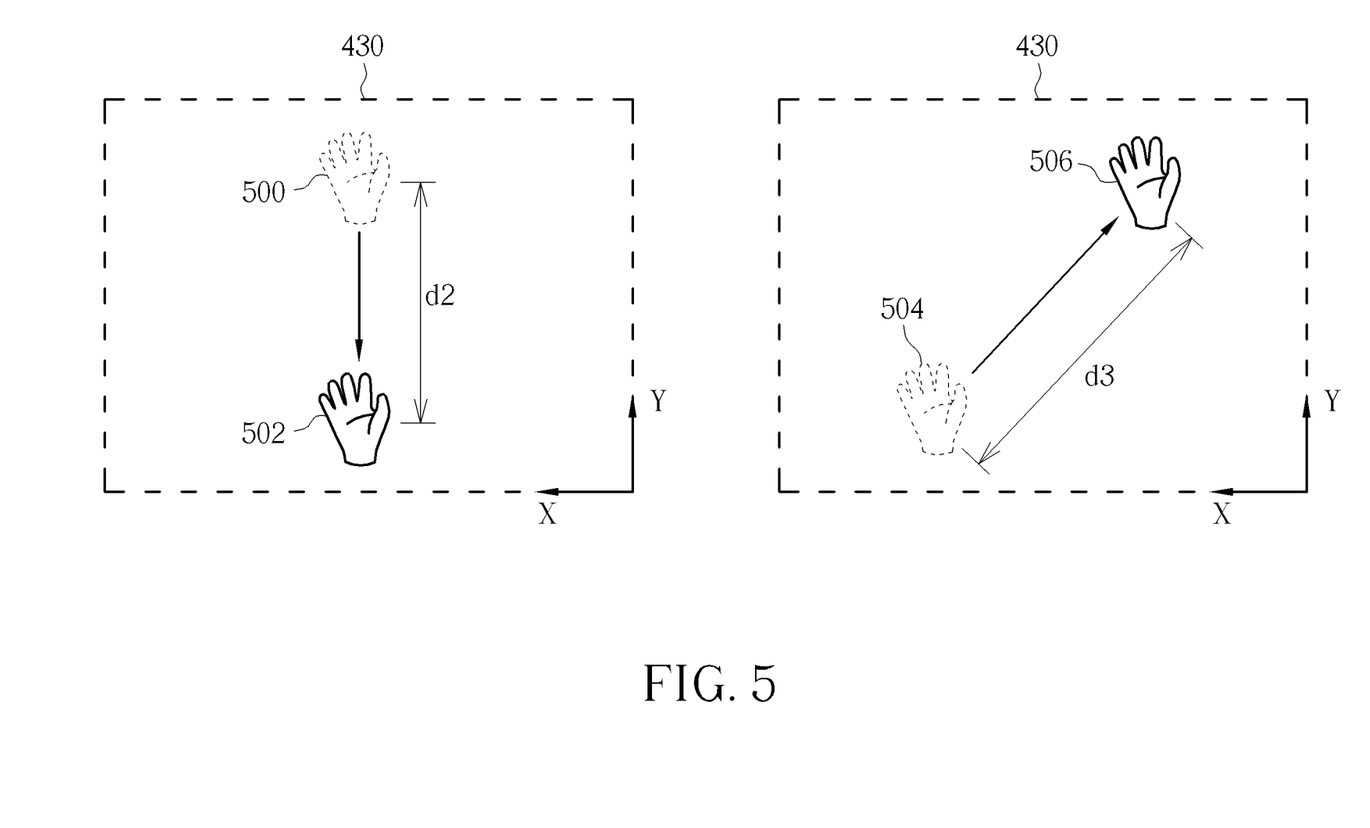
FIG. 5 is a schematic diagram of positions of the hand moving back-and-forth according to an embodiment of the present invention.

Please refer to FIG. 5, which is a schematic diagram of positions before and after the hand moves according to an embodiment of the present invention. As shown in FIG. 5, when the hand moves from a position 500 to a position 502 (moves from top to bottom), the computing unit 102 calculates the vertical distance d2 after projecting the position 500 and the position 502 on the virtual vertical plane 430. Or, when the hand moves from a position 504 to a position 506, the computing unit 102 calculates the vertical distance d3 after projecting the position 504 and the position 506 on the virtual vertical plane 430. According to the above, the computing unit 102 acquires the lateral distance between the positions before and after the hand moves, for the determining unit 104 to determine whether the gesture of the user is the back-and-forth gesture.

Figure 6:
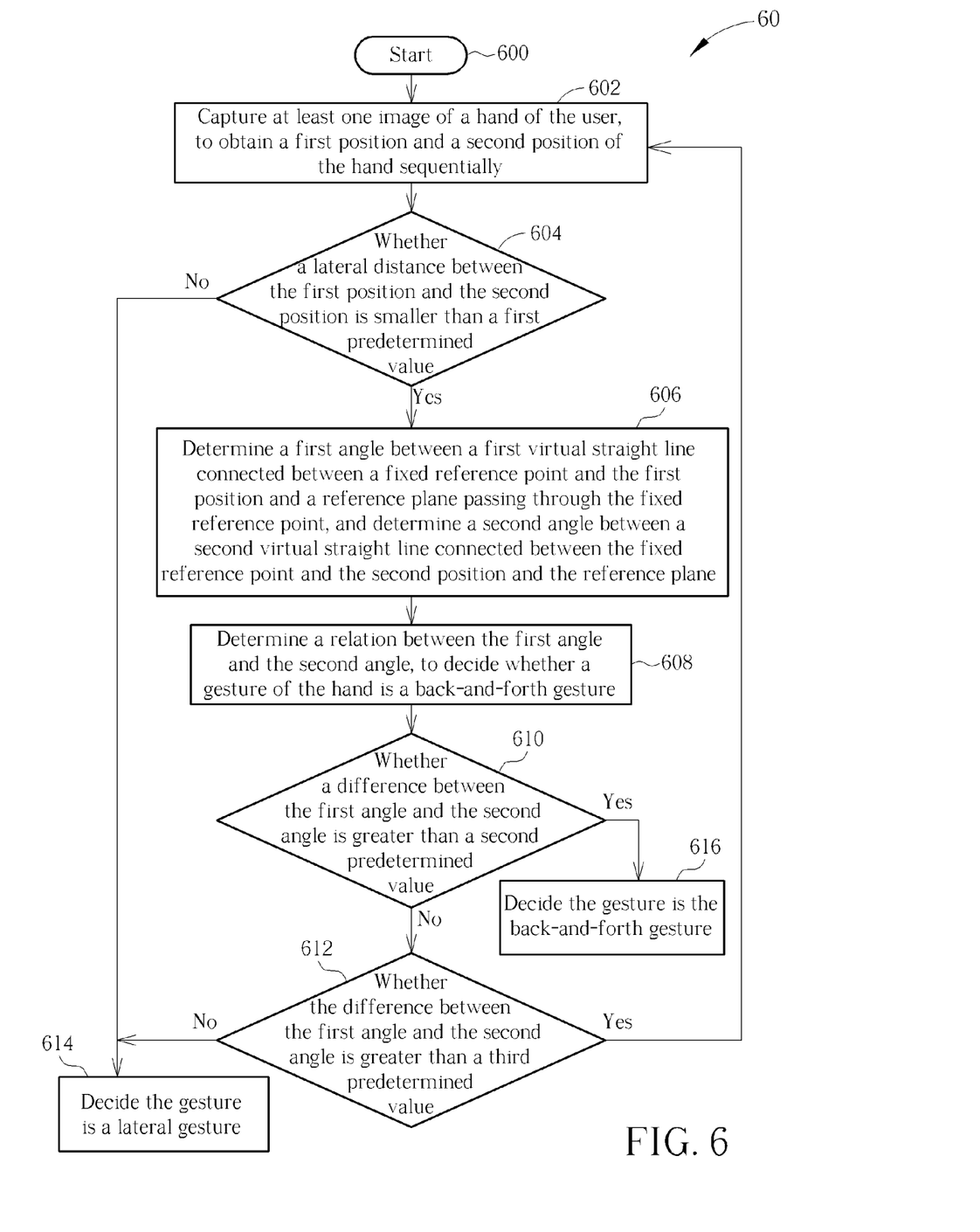
FIG. 6 is a flowchart of a process according to an embodiment of the present invention.

According to the above, the operation of the gesture recognition module 10 shown in FIG. 1 can be summarized as a process 60 shown in FIG. 6. The process 60 comprises the following steps:

Step 600: Start.

Step 602: Capture at least one image of a hand of the user, to obtain a first position and a second position of the hand sequentially.

Step 604: Determine whether a lateral distance between the first position and the second position is smaller than a first predetermined value. If the lateral distance between the first position and the second position is smaller than the first predetermined value, perform step 606; otherwise, perform step 614.

Step 606: Determine a first angle between a first virtual straight line connected between a fixed reference point and the first position and a reference plane passing through the fixed reference point, and determine a second angle between a second virtual straight line connected between the fixed reference point and the second position and the reference plane.

Step 608: Determine a relation between the first angle and the second angle, to decide whether a gesture of the hand is a back-and-forth gesture.

Step 610: Determine whether a difference between the first angle and the second angle is greater than a second predetermined value. If the difference between the first angle and the second angle is greater than the second predetermined value, perform step 616; otherwise, perform step 612.

Step 612: Determine whether the difference between the first angle and the second angle is greater than a third predetermined value. If the difference between the first angle and the second angle is greater than the third predetermined value, perform step 602; otherwise, perform step 614.

Step 614: Decide the gesture is a lateral gesture.

Step 616: Decide the gesture is the back-and-forth gesture.

Operations and variations of the process 60 can be referred to the above illustration, and are not narrated herein.

To sum up, the present invention provides a gesture recognition module and a gesture recognition method capable of recognizing the back-and-forth gesture of the hand accurately, to solve the gesture misjudging problem when the user does not locate directly in front of the detector in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A gesture recognition module, for recognizing a gesture of a user, the gesture recognition module comprising:
    a detecting unit, comprising at least one image capture device, for capturing at least one image of a hand of the user, to obtain a first position and a second position of the hand sequentially;
    a computing unit, electrically coupled to the detecting unit, for determining a first angle between a first virtual straight line connected between a fixed reference point and the first position and a reference plane passing through the fixed reference point, and determining a second angle between a second virtual straight line connected between the fixed reference point and the second position and the reference plane; and
    a determining unit, electrically coupled to the computing unit, for determining a relation between the first angle and the second angle, to decide whether a gesture of the hand is a back-and-forth gesture,
    wherein the reference plane is a horizontal reference plane,
    wherein the determining unit decides the back-and-forth gesture is a lateral gesture, when a difference between the first angle and the second angle is smaller than a predetermined value.

2. The gesture recognition module of claim 1, wherein the determining unit decides the gesture is the back-and-forth gesture, when a difference between the first angle and the second angle is greater than a predetermined value.

3. The gesture recognition module of claim 2, wherein the determining unit decides the back-and-forth gesture is a pushing forward gesture when the first angle is greater than the second angle, and decides the back-and-forth gesture is a pulling back gesture when the first angle is smaller than the second angle.

4. The gesture recognition module of claim 1, wherein the fixed reference point locates at a head of the user.

5. The gesture recognition module of claim 4, wherein the fixed reference point locates at a center of the head.

6. The gesture recognition module of claim 4, wherein the fixed reference point locates at a nose of the head.

7. The gesture recognition module of claim 1, wherein the determining unit determines whether a lateral distance between the first position and the second position is smaller than a first predetermined value, before determining the relation between the first angle and the second angle.

8. The gesture recognition module of claim 7, wherein the determining unit decides the gesture is the back-and-forth gesture, when determining the lateral distance between the first position and the second position is smaller than the first predetermined value and a difference between the first angle and the second angle is greater than a second predetermined value.

9. The gesture recognition module of claim 7, wherein the determining unit decides the gesture is a lateral gesture when determining the lateral distance between the first position and the second position is greater than the first predetermined value.

10. The gesture recognition module of claim 7, wherein the computing unit builds a virtual vertical plane on a third virtual straight line connected between the detecting unit and the user, to determine the lateral distance between the first position and the second position on the virtual vertical plane.

11. The gesture recognition module of claim 7, wherein the lateral distance is a horizontal distance or a vertical distance.

12. The gesture recognition module of claim 1, wherein the first position and the second position are positions of a fingertip of the hand.

13. The gesture recognition module of claim 1, wherein the first position and the second position are positions of a center of a palm of the hand.

14. The gesture recognition module of claim 1, wherein the first position and the second position are positions of a center of the hand.

15. A gesture recognition method, for recognizing a gesture of a user, the gesture recognition method comprising:
    capturing at least one image of a hand of the user, to obtain a first position and a second position of the hand sequentially;
    determining a first angle between a first virtual straight line connected between a fixed reference point and the first position and a reference plane passing through the fixed reference point, and determining a second angle between a second virtual straight line connected between the fixed reference point and the second position and the reference plane;
    determining a relation between the first angle and the second angle, to decide whether a gesture of the hand is a back-and-forth gesture; and
    deciding the back-and-forth gesture is a lateral gesture, when a difference between the first angle and the second angle is smaller than a predetermined value,
    wherein the reference plane is a horizontal reference plane.

16. The gesture recognition method of claim 15, wherein the step of determining the relation between the first angle and the second angle, to decide whether the gesture of the hand is the back-and-forth gesture comprises:
    deciding the gesture is the back-and-forth gesture, when a difference between the first angle and the second angle is greater than a predetermined value.

17. The gesture recognition method of claim 16, further comprising:
    deciding the back-and-forth gesture is a pushing forward gesture when the first angle is greater than the second angle, and deciding the back-and-forth gesture is a pulling back gesture when the first angle is smaller than the second angle.

18. The gesture recognition method of claim 15, wherein the fixed reference point locates at a head of the user.

19. The gesture recognition method of claim 18, wherein the fixed reference point locates at a center of the head.

20. The gesture recognition method of claim 18, wherein the fixed reference point locates at a nose of the head.

21. The gesture recognition method of claim 15, wherein the step of determining the relation between the first angle and the second angle, to decide whether the gesture of the hand is the back-and-forth gesture comprises:
    determining whether a lateral distance between the first position and the second position is smaller than a first predetermined value, before determining the relation between the first angle and the second angle.

22. The gesture recognition method of claim 21, further comprising:
  deciding the gesture is the back-and-forth gesture, when determining the lateral distance between the first position and the second position is smaller than the first predetermined value and a difference between the first angle and the second angle is greater than a second predetermined value.

23. The gesture recognition method of claim 21, further comprising:
  deciding the gesture is a lateral gesture, when determining the lateral distance between the first position and the second position is greater than the first predetermined value.

24. The gesture recognition method of claim 21, further comprising:
  building a virtual vertical plane on a third virtual straight line connected between the detecting unit and the user, to determine the lateral distance between the first position and the second position on the virtual vertical plane.

25. The gesture recognition method of claim 21, wherein the lateral distance is a horizontal distance or a vertical distance.

26. The gesture recognition method of claim 15, wherein the first position and the second position are positions of a fingertip of the hand.

27. The gesture recognition method of claim 15, wherein the first position and the second position are positions of a center of a palm of the hand.

28. The gesture recognition method of claim 15, wherein the first position and the second position are positions of a center of the hand.

* * * * *